July 24, 1956 H. H. MERRIMAN 2,755,681
PRESSURE UNIT
Filed Dec. 22, 1954
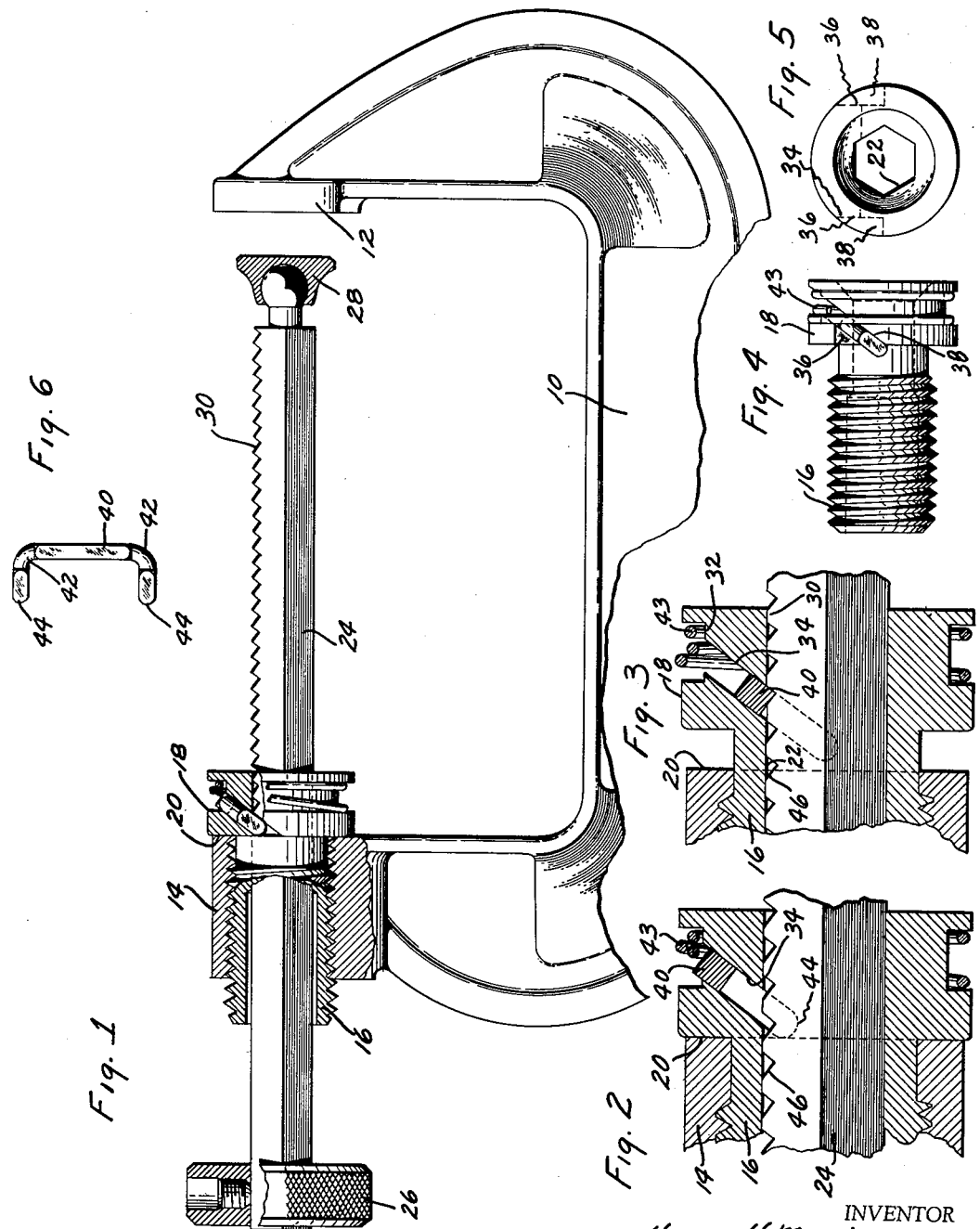
INVENTOR
Henry H. Merriman
BY
ATTORNEY

United States Patent Office 2,755,681
Patented July 24, 1956

2,755,681

PRESSURE UNIT

Henry H. Merriman, Jackson, Mich.

Application December 22, 1954, Serial No. 477,092

7 Claims. (Cl. 74—424.8)

The present invention relates to improvements in pressure units suitable for use in C-clamps, jigs and fixtures and similar fields of application in which a thrust rod or shaft is advanced and retracted with a rapid traverse movement with the advance of a screw being available for clamping.

While devices of the aforesaid type are well known in the art, it is the object of the present invention to overcome, in an improved and novel manner, the tendency for the operator of such devices to fail to properly position the component parts upon repeated use.

According to the invention, the clutch mechanism between the axially slidable thrust rod and the threaded bushing is such that the threaded bushing, following each clamping operation, must be rotated back into its initial position before declutching and rapid traverse of the rod in the bushing is capable of being effected.

In the illustrated form of the invention,

Fig. 1 is a side elevational view of the invention shown applied to a C-clamp with portions of the assembly being shown in broken section, Fig. 2 is an enlarged fragmentary section of the clutch mechanism in a released position, Fig. 3 is a view similar to Fig. 1 with the clutch mechanism engaged, Fig. 4 is a side elevational view of the threaded bushing and clutch mechanism, Fig. 5 is an end view of Fig. 4 as viewed from the right with the spring and clutch member shown removed, and Fig. 6 is a side view of the U-shaped clutch member.

Referring to the drawings, the C-clamp frame 10 has an abutment portion 12 axially aligned with the internally threaded aperture 14 in which the externally threaded bushing 16 is received to position the collar portion 18 thereof in opposed relation to the annular abutment shoulder 20 of the frame 10.

The bushing 16 is step drilled in production with the portion of smaller diameter being broached to provide the hexagon hole portion 22 which receives the hexagon thrust bar 24 with a sliding fit. One end of the bar 24 is shown equipped with a handle knob 26 and the other end with a conventional pressure foot 28. Teeth 30 are milled, or otherwise provided, along one face of the bar 24 with the shape of the teeth 30 being of specific form as hereinafter more fully described.

The bushing 16, in practice, will be machined from bar stock in an automatic screw machine, the finished blank having an annular groove 32 and a step drilled center hole of the shape shown in dotted outline in Fig. 4, the hexagon hole 22 being broached from the hole of lesser diameter as heretofore described. Thereafter the collar 18 is cross milled or sawed to provide the inclined cross slot 34 which opens at its outer portion into the groove 32 and at its inner portion through the wall of the hexagon hole 22. The collar portion 18 is then straddle milled at an angle to the longitudinal axis of the bushing 16 to provide the parallel faces 36 and the inclined faces 38 disposed at 90° to the faces 36.

The slot 34 and the straddle milled portions of the collar 18 are shaped and dimensioned to receive, with a free sliding fit, the U-shaped detent 40 which is shown of square stock except at the corners 42 which are of circular section for limited extensions to facilitate bending of the corners and to avoid, at the time of the bending operation, the thickening up of any portion of the detent 40 in excess of the central square stock portion. A coil spring 43 disposed in the groove 32 engages over the corners 42 to urge the detent 40 into the down position of Figs. 3 and 4. In this down position the detent 40 engages with the teeth 30 of the bar 24.

The operation of the structure described above follows:

Rotation in one direction of the rod 24 by the handle 26 will result in the bushing 16 being rotated in the threaded aperture of the frame 10 to bring the collar 18 into engagement with the annular abutment shoulder 20 as well as the leading ends 44 of the detent 40. Such engagement with the ends 44 will slide the detent 40 up the inclined slot 34 against the stress of the spring 43 to withdraw the detent 40 from engagement with the teeth 30, as seen in Figs. 1 and 2. The bar 24 may then be axially moved to the left as viewed in Fig. 1 relative to the bushing 16 to increase the distance between the abutment 12 and the foot 28 as, for example, to release the object being clamped. In this manner the rapid traverse movement in one direction may be effected. Rapid traverse in the opposite direction may take place with the detent 40 in either position of Figs. 2 and 3 because of the shape of the teeth 30 as well as the member 40 which will enable the detent 40 to be ratcheted or cammed out of the way of each tooth when the rod 24 is moved to the right in Fig. 3 due to the sloping surfaces 46 of the teeth 30, the adjacent surfaces 48 of the teeth 30 being substantially parallel to the sides of the slot 34 and to that portion of the detent 40 engaged by the surfaces 48, movement of the rod 24 to the left is prevented by the detent 40 when the latter is in its lowered position and which is placed in shear as shown in Fig. 3. With the detent 40 in the position of Fig. 3, rotation of the rod 24 will rotate the bushing 16 to advance the rod 24 with the mechanical movement of the screw of the bushing 16.

When the detent 40 is in the raised or released position of Fig. 2, rotation of the rod 24 will rotate the bushing 16 to project the same from the frame 10 sufficiently to remove the ends 44 of the detent 40 from the annular abutment 20 to enable the spring 43 to lower the detent 40 into engagement with the teeth 30 of the bar 24. Continued rotation thereof in the same direction will continue to advance the bushing 16 and bar 24 as a unit. Thereafter, before the bar 24 may have rapid traverse to the left independently of the bushing 16, the bushing 16 must be retracted into its initial position by rotation of the bar 24 and bushing 16 as a unit to bring the ends 44 of the detent 40 into engagement with the annular abutment 20 to raise the detent 40 sufficiently to clear the teeth 30. It will be understood that movement of the detent 40 in the inclined slot 34 in either direction takes place with the ends 44 in sliding engagement with the annular abutment 20 and being rotated about the axis of the bushing 16 and bar 24 as a unit.

One outstanding advantage of the present invention over known structures resides in the fact that even under conditions of repeated use the bushing 16 has no tendency to be rotated out of the frame 10 for the reason that each time following rapid traverse to the right, plus a final screwing advance against a resisting object, the bushing 16 must be fully threaded back into the frame 10 before rapid traverse to the left may take place.

Having thus described my invention what I claim as new and desire to protect by Letters Patent is:

1. A pressure unit comprising a thrust bar and bushing assembly in which said bar is slidably and non-rotatably supported in said bushing, a support having an aperture in which said bushing is received, first means in said aperture and on said bushing to advance and retract said bushing in said aperture upon relative rotation of said bushing and bar assembly in and with reference to said aperture, a detent carried by said bushing for selective engagement with said bar to clutch said bar and bushing together against relative sliding movement in one direction, means on said bar for selective engagement with said detent, second means associated with said detent and engageable with said support upon relative movement of said bushing and said support in a direction to engage said second means and said support to move said detent into a released position, and third means for moving said detent into a position to clutch said bar upon relative movement of said bushing and said support in a direction to disengage said second means and said support.

2. A pressure unit as defined in claim 1 wherein said bar has thereon longitudinally spaced projections with which said detent engages to clutch said bar to said bushing at selected places along its length.

3. A pressure unit as defined in claim 1 wherein said detent rotates as a unit with said assembly.

4. A pressure unit as defined in claim 1 wherein said detent rotates as a unit with said assembly and said support presents an annular abutment embracing said assembly with which said second means engages to release said detent.

5. A pressure unit as defined in claim 1 wherein said detent rotates as a unit with said assembly and said support presents an annular abutment embracing said assembly with which said second means engages with rotary sliding movement to release said detent.

6. A pressure unit as defined in claim 1 wherein said bushing has a slot defined therein and said detent is in the form of a member slidable in said slot to engage and disengage said bar.

7. A pressure unit as defined in claim 1 wherein said bushing has a transverse inclined slot exposing said bar, said bar having longitudinally spaced teeth thereon exposed by said slot, and said detent and second means take the form of a U-shaped member slidable in said slot to engage with said teeth with portions of said member engageable with said support to move said member in said slot out of engagement with said teeth.

References Cited in the file of this patent
UNITED STATES PATENTS 2,313,361 Richards _____ Mar. 9, 1943